United States Patent [19]

Balkus, Jr.

[11] 4,003,364
[45] Jan. 18, 1977

[54] SOLAR HEATING SYSTEM

[76] Inventor: Carl E. Balkus, Jr., 147 Deepwood Drive, Amston, Conn. 06231

[22] Filed: Feb. 26, 1975

[21] Appl. No.: 553,222

[52] U.S. Cl. .............................. 126/271; 165/183
[51] Int. Cl.² ............................................ F24J 3/02
[58] Field of Search ............ 126/270, 271; 165/183

[56] References Cited

UNITED STATES PATENTS

| | | | |
|---|---|---|---|
| 2,434,519 | 1/1948 | Raskin | 165/183 X |
| 3,262,493 | 7/1966 | Hervey | 126/271 X |
| 3,310,102 | 3/1967 | Trombe | 126/270 X |
| 3,847,136 | 11/1974 | Salvail | 126/271 |
| 3,866,285 | 2/1975 | Clark | 126/271 X |

Primary Examiner—William E. Wayner
Assistant Examiner—William E. Tapolcai, Jr.
Attorney, Agent, or Firm—McCormick, Paulding & Huber

[57] ABSTRACT

One or more heat absorbing panels are arranged on a generally flat area provided over an underground fluid storage reservoir, and the fluid is pumped from the reservoir through finned tubes in each panel and thence back to the reservoir or is pumped through a distribution system to heat one or more houses or the like. Each panel has reflective surfaces associated with each tube to efficiently capture the suns rays, and each tube has projecting fins so oriented as to absorb both direct sun light and also any rays reflected from these surfaces.

18 Claims, 3 Drawing Figures

SOLAR HEATING SYSTEM

SUMMARY OF THE INVENTION

This invention relates generally to solar heat absorbing devices and deals more particularly with a unique solar heat absorbing panel wherein the tubes are uniquely formed so as to efficiently capture the suns energy or rays. Further, means is provided for efficiently utilizing this heat and for storing heat in a reservoir containing a relatively large guantity of fluid circulated through these tubes.

The object of the present invention then is to provide an apparatus which will efficiently utilize solar heat in order to provide a balanced heating system for a plurality of residential homes or the like arranged on a distribution loop so as to receive fluid from the reservoir in which the heated fluid is stored. The heat collecting panel is designed to lie substantially flat except that it may be inclined slightly in order to drain off any rain water or the like. The tubes within the heat collecting panel are so constructed and arranged as to be capable of withstanding the relatively high temperatures imposed upon them when the sun is heating fluid contained therein. On the other hand, when the relatively cold night temperatures are encountered, and particularly where the fluid handled is water, means is provided to permit the water to expand within the tubes without damage to the tubes themselves.

DETAILED DESCRIPTION

Figure 1:
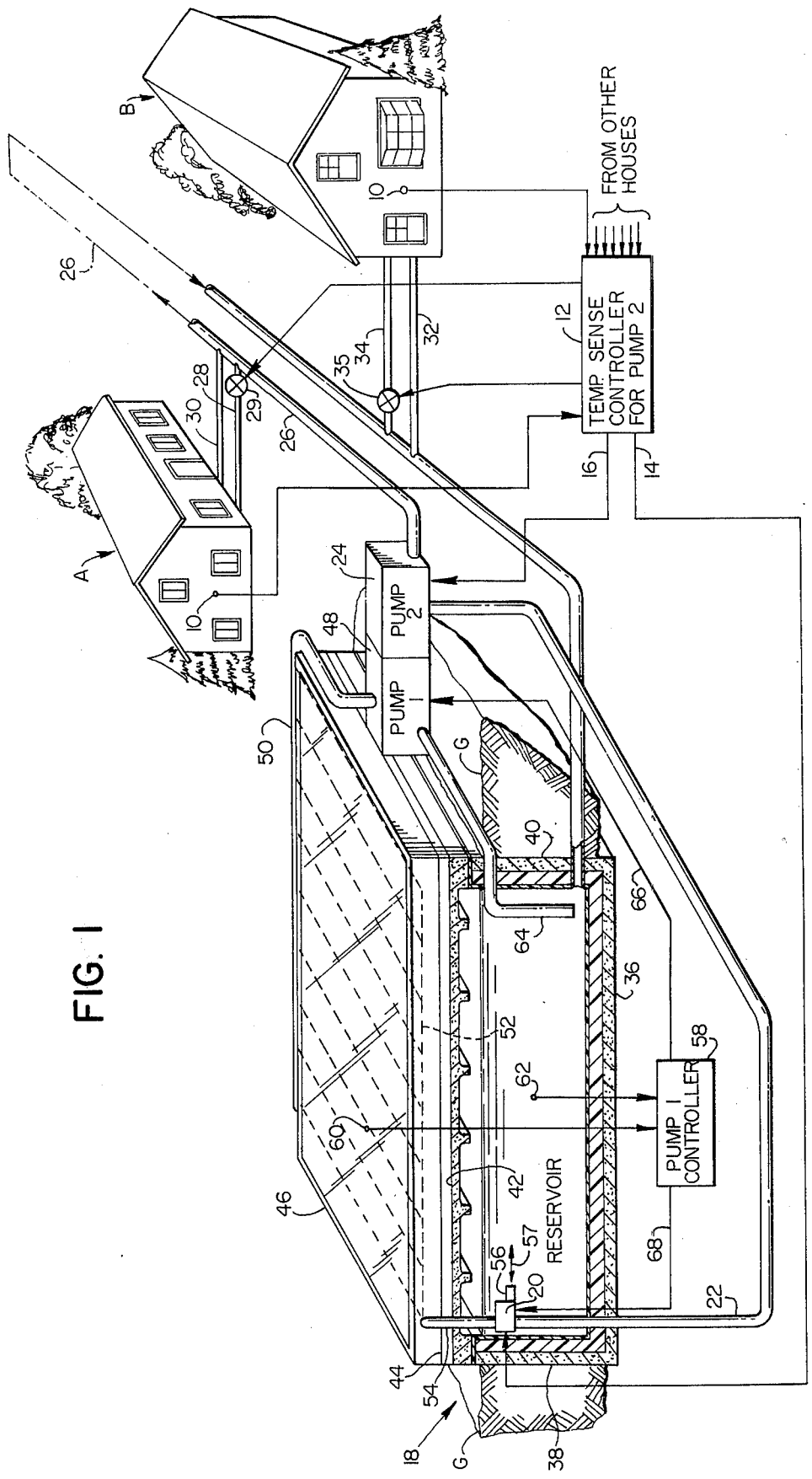
FIG. 1 is a schematic view illustrating the overall configuration of a solar heating system constructed in accordance with the present invention.

Turning now to the drawings in greater detail, FIG. 1 shows two houses A and B representing a community of residential dwellings which are to be supplied with heat from a single source located in the immediate neighborhood. Each house has a thermostat 10 providing an input signal to a controller 12 of conventional configuration whereby the controller 12 is adapted to produce an output signal in lines 14 and 16 when any one of the houses A, B and so forth are calling for heat. More particularly, a reservoir 18 adapted to store a relatively large quantity of heated fluid, such as water, is provided with a valve 20 such that warm fluid is adapted to be withdrawn through line 22 and to be pumped by pump number 2 indicated generally by reference numeral 24 so as to be pumped through a loop defined by line 26. Each house is adapted to withdraw fluid from this line 26 as indicated generally at reference numeral 28 and 30 for house A and 32, 34 for house B. Thermostat 10 in each of the houses A and B controls a valve 29 and 35 in lines 28 and 34 to allow heat to enter only that house, A or B. The lines 28 and 34 are input lines to each of the houses A and B respectively, whereas the lines 30 and 32 return fluid from these houses back to the loop 26. These return lines 30 and 32 associated with each house, A and B, include a balance valve (not shown) such that houses more remote from the source of heated fluid are adapted to receive a higher fluid flow rate then those arranged in closer relationship to such heated fluid source. The general configuration for such valves is well known in the art and need not be described in detail herein.

Turning next to a detailed description of the mode of operation for the reservoir, and more particularly for heating the fluid within the reservoir it will be seen from FIG. 1 that such reservoir 18 comprises a generally rectangular tank having a bottom wall or floor well below grade level and indicated generally at 36. The sidewalls of the tank indicated generally at 38 and 40 are also located, throughout a major portion of their depth, underground as indicated generally by the grade level G. These walls may be provided with a insulating layer of Styrofoam material so as to reduce the heat loss from the fluid in the reservoir to the adjacent ground G. The roof 42 of the tank may be provided of reinforced concrete, and may also include a layer of insulating material 44 which material may comprise Styrofoam or the like. It should be noted that the layer 44 of Styrofoam may be more extensive than the roof area 42 and that the roof area is dictated by the geometry of the reservoir rather than the area of the heat collecting panels to be described. A rectangular frame is provided around the periphery of the paneled area as indicated generally at 46, and a plurality of heat collecting panels are arranged on the top of the reservoir 42 and more particularly on the Styrofoam insulating layer 44 in a manner to be described in greater detail with reference to FIGS. 2 and 3. It should be noted that the sidewalls 38 and 40 need not be vertical, but might be inclined slightly to provide a trapezoidally shaped reservoir. Also the Styrofoam layer 44 might be floated on the surface of the water in the reservoir instead of providing a roof structure 42. As mentioned previously, the area of layer 44 will be dictated by the heating requirements of the loop or loops 26, 26, and more particularly by the area of the heat absorbing or collecting panels required.

Still with reference to FIG. 1, it is noted that these heat collecting panels are conventional in that the source of fluid to be heated is pumped to one side of the panels by pump number 1 indicated generally by reference numeral 48, through the long side of the rectangular paneled structure by a feed pipe 50. The fluid then passes through tubes defined in the heat collecting panels so as to absorb solar energy falling thereon from the sun, indicated in FIG. 1, with the result that heated fluid is provided in the rear side 52 of the paneled structure and thence downwardly to be either returned to the reservoir through valve 20 through outlet pipe 56, or in the alternative to be directed downwardly through line 54 to be pumped directly through line 22 by pump number 2, indicated generally at 24 in FIG. 1, through the loop 26.

The controller 58 for pump number 1 indicated generally at 48 is adapted to control the valve 20 such that warm fluid is either returned to the reservoir as described above, or such fluid is made available to pump number 2 for distribution through the loop 26 as indicated by the double arrow 57. A thermocouple 60 located in one of the heat collecting panels is adapted to provide an input signal to the controller for pump number 1 by way of comparison to a second thermocouple 62 provided in the fluid reservoir such that when the difference between these two thermocouples is sufficient controller 58 initiates operation of pump number 1 so as to withdraw fluid from the reservoir through lines 64 and thence to the heat pipe 50 so that the fluid can be heated. Line 66 provides this input signal to pump number 1 as indicated in FIG. 1. A second output may be provided through line 68 to so position the valve 20 that fluid is adapted to be returned to the reservoir after being so heated, this being the preferred situation when no heat is being called for at one or more of the houses arranged on the loop 26.

Figure 2:
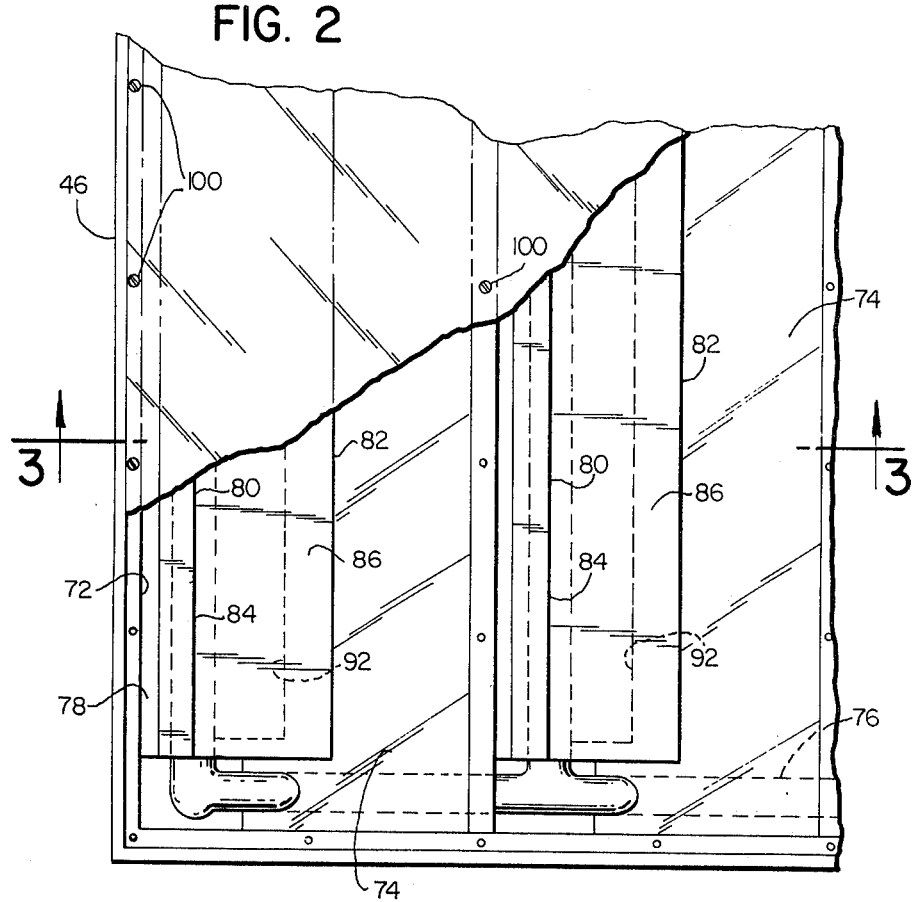
FIG. 2 is a fragmentary view showing one corner of a solar heat collecting panel constructed in accordance with the present invention.
Figure 3:
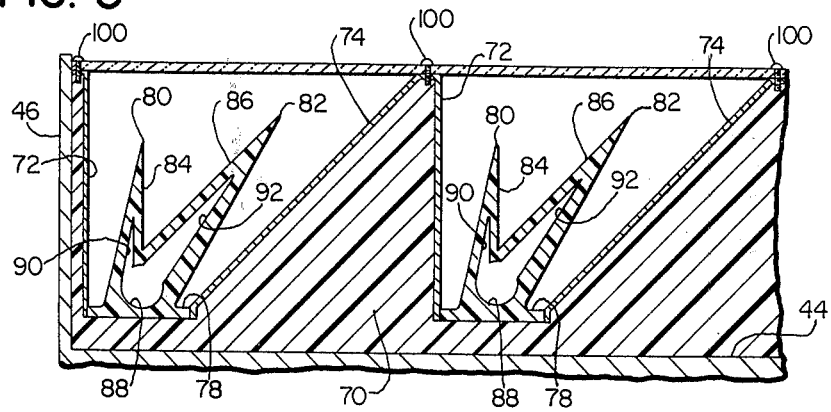
FIG. 3 is a vertical sectional view taken generally on the lines 3—3 of FIG. 2.

Turning next to a more complete description of the heat collecting panels arranged on the roof of the reservoir or tank depicted in FIG. 1, FIGS. 2 and 3 show one such panel and more particularly illustrate the lower left-hand corner of the roof structure depicted in FIG. 1. The peripheral boundary of the structure is indicated in FIG. 2 as comprising a sidewall 46 which sidewall extends downwardly to protect the heat collecting panel itself, and also to protect the underlying layer of Styrofoam 44 provided thereunder. As mentioned above the roof structure may comprise concrete or the like 42 and may include reinforcing ribs intersecting one another at right angles as is conventional practice in concrete construction generally. The Styrofoam layer 44 is preferably covered with a layer of aluminum foil or the like and the heat collecting panels of the present invention are provided above such layer.

Each panel comprises a Styrofoam base 70, which base is precut to define upwardly open, generally trapezoidally shaped, cavities two of which are illustrated in FIG. 3. These cavities are preferably wider at their open tops than at the bottom, and each includes a generally vertically extending sidewall to which is attached a reflective surface such as indicated generally at 72 in FIG. 3. The opposite sidewall of each of these cavities preferably includes an inclined reflective surface also attached to the Styrofoam base, such inclined reflective surface 74 being arranged at approximately 45° to the horizontal. At this angle the suns rays, in the Fall and Spring of the year, will be generally parallel to such surface 74 at least in the temperature zone in the northern hemisphere. The suns rays are at approximately 45° angle in this geographical area, September through November and again between February and April. It is during these periods of time that the most efficient use can be made of solar energy.

Still with reference to FIGS. 2 and 3, means is provided for introducing fluid to be heated to tubes within the cavities defined for this purpose in the base 70, and such means includes the feed tube 50 mentioned previously with reference to FIG. 1, and also the return tube or pipe indicated generally at 76 in FIG. 2. The return pipe 76 communicates with the pipe 54 mentioned previously with reference to FIG. 1 and thus a plurality of generally parallel paths are provided to circulate fluid from the reservoir through the heat collecting tubes and thence to return the fluid either to the reservoir or to send heated fluid directly to one or more houses calling for heat.

Turning next to a more detailed description of the construction for these tubes, FIG. 3 shows the tubes in vertical section, and each tube can be seen to include a base portions 78 which is adapted to occupy the shorter side of the generally trapezoidally shaped cavity and is preferably cemented thereto. The tube is fabricated from a plastic material by an extrusion process, and the presently preferred material for extruding these tubes is reinforced polyvinylchloride having a black color such that the solar energy from the sun can be readily absorbed by the tube and more particularly by upwardly projecting fins, each fin being oriented at an appropriate angle such that the reflective surfaces 72 and 74 are adapted to reflect energy back to the fins and more significantly to avoid reflecting any solar energy outwardly of the cavity itself. As shown in FIG. 3 two such projecting fins are preferably provided and each of these fins can be seen to have a generally triangular cross section such that one of the fin surfaces on each fin is oriented parallel one of the two reflective surfaces 72 and 74.

The shorter fin 80 associated with each of these tubes has a generally vertical surface 84 parallel to vertical reflective surface 72. The longer inclined fine 82, has a surface 86 located adjacent the surface 84 which surface 86 is parallel the reflective surface 74. It has been found that this arrangement of surfaces on the fins 80 and 82 with respect to the reflective surfaces 72 and 74 gives the desired triangular shape for the fins and also gives the desired reflective characteristics of the structure to solar heat such that very little or no solar energy is adapted to be reflected back into space especially during the Spring and Fall of the year in the latitudes mentioned previously. The suns rays reflect off surfaces 84 and 86 to be reflected back and forth on these surfaces 84 and 86 one or more times but always toward tube 88. Little or no energy is reflected back into space because of the geometry of the fins. The surfaces 84 and 86 intersect at a point well above tube 88.

Still with reference to the triangular configuration of the fins 80 and 82 it will be noted that the generally circular opening 88 provided for the fluid in the extruded tubes includes a pair of upwardly projecting generally triangular cavities 90 and 92 associated with each of these triangular fins such that the entire tube s given a minimal cross sectional size thereby minimizing the material required to extrude the tube, and also such that the tube is readily adapted to expand as would be the case if the fluid in the tube should freeze or otherwise expand. Thus, the tube configuration provides a very efficient shape from the point of view of the absorption of solar energy, and also from a practical point of view the tube shown is capable of withstanding extremes of temperature in the hostile environment of a solar panel in these northern latitudes.

Still with reference to FIGS. 2 and 3, the heat collecting panel further includes a transparent cover of acrylic plastic or glass, which cover is supported by the upper edges of the Styrofoam base, and which cover may be attached to the base by means of fasteners as indicated generally at 100, 100. This cover keeps dust and rainwater off the solar panel's fins and reflecting surfaces.

In conclusion then the heat collecting panel depicted in FIGS. 2 and 3 provides a significant improvement over collector panels previously known in that the shape of the cavities in which the tubes are uniquely arranged provides for the efficient absorbtion of solar energy in the rather hostile environment where such a panel is normally provided. The triangular fins defined in the heat absorbing tube structure have their respective surface uniquely related to the reflective surfaces 72 and 74, and one of each of the surfaces of the two fins depicted in FIG. 3 are parallel to one of these reflective surfaces respectively, whereas the other surfaces of the triangular fins are adapted to intersect at a point well below the base 70 and in fact will intersect at a point well below the intersection of the two reflective surfaces themselves. The generally vertical fin 80 extends upwardly to occupy approximately two-thirds the height of the trapezoidally shaped cavity in which it is situated, whereas the longer inclined fin 82 extends upwardly in this cavity to occupy approximately three-fourths of the height of such trapezoidally shaped cavity. Thus, when the incident solar radiation falls upon the cavity, at the range of declinations associated with Spring and Fall of the year in the nothern temperature zone, the suns rays will be approximately parallel to the reflective surface 74 with the result that these rays are reflected back toward the blackened tube and more particularly toward the fins thereof with the result that even if such radiation is again reflected off these fins it will bounce again off such reflective surfaces and be returned to the heat absorbing tube material. Further, none of this incident radiation is adapted to be reflected back into space with the result that the tube configuration will necessarily absorb a greater percentage of the incident solar energy then has been possible with prior art configurations.

I claim:
1. A solar heating panel comprising:
   a. a generally horizontally extending base,
   b. a plurality of generally vertically extending reflective surfaces supported by said base,
   c. a plurality of inclined reflective surfaces extending downwardly between said vertical surfaces and also supported by said base,
   d. said reflective surfaces defining generally trapezoidally shaped upwardly open cavities therebetween which cavities are wider at their open tops than at their bottoms, and
   e. fluid conduits at the bottoms of said cavities extending longitudinally of said cavities and also supported on said base,
   f. said conduits each including at least one upwardly projecting fin oriented at an angle between said generally vertical reflective surface and said inclined reflective surface said conduit fabricated from and extruded plastic material, said fin integrally formed therein, and integrally formed flanges in said conduit for attaching said plastic conduit to said base and to absorb solar radiation reaching the bottom of its associated cavity.

2. A solar heating panel according to claim 1 wherein said fin has a generally triangular cross sectional shape such that one fin surface faces one of said reflective surfaces and the other fin surface is generally parallel to the other of said reflective surfaces.

3. A solar heating panel according to claim 1 wherein said fins comprise at least two in number, and wherein both fins have generally triangular cross sectional shapes such that each has one fin surface facing one of said reflective surfaces and the other fin surface facing the other fin and oriented parallel the other of said reflective surfaces, said fin defining conduit fabricated from an extruded plastic material and having a black color to absorb solar energy.

4. A solar heating panel according to claim 3 wherein said conduit has a fluid opening so defined that a portion of said opening extends upwardly into at least one of said at least two fins.

5. A solar heating panel according to claim 4 wherein said triangular shaped upwardly projecting fins have their respective vertices spaced below the upper marginal edges of said reflective surfaces, and a transparent cover supported by the upper edges of said reflective surfaces.

6. A solar heating panel according to claim 1 wherein said conduit fin surfaces which face each other define an angle at least approximately equal to that defined by the two reflective surfaces which define the cavity in which said conduit is mounted, and such that the facing fin surfaces intersect one another above said conduit.

7. A solar heating panel according to claim 6 wherein said conduit fin surfaces which face said reflective surfaces, respectively, define inclined planes which if extended downwardly will intersect one another at or below the similarly defined intersection of said reflective surfaces.

8. A solar heating panel according to claim 7 wherein the plurality of upwardly open cavities defined by said reflective surfaces are separated by generally triangular upstanding portions of said base, said base being fabricated from a material with heat insulating properties.

9. A solar heating panel comprising:
   a. a generally horizontally extending base,
   b. a plurality of generally vertically extending reflective surfaces supported by said base,
   c. a plurality of inclined reflective surfaces extending downwardly between said vertical surfaces and also supported by said base,
   d. said reflective surfaces defining generally trapezoidally shaped upwardly open cavities therebetween which cavities are wider at their open tops than at their bottoms, and
   e. fluid conduits at the bottoms of said cavities extending longitudinally of said cavities and also supported on said base,
   f. said conduits each including at least one upwardly projecting fin oriented at an angle between said generally vertical reflective surface and said inclined reflective surface and each said conduit fabricated from an extruded plastic material, and wherein said conduit has a fluid opening so defined that a portion of said opening extends upwardly into said fin and said fin having a generally triangular cross sectional shape such that one fin surface faces one of said reflective surfaces and the other fin surface is generally parallel to the other of said reflective surfaces.

10. A solar heating panel comprising:
   a. a generally horizontally extending base,
   b. a plurality of generally vertically extending reflective surfaces supported by said base,
   c. a plurality of inclined reflective surfaces extending downwardly between said vertical surfaces and also supported by said base,
   d. said reflective surfaces defining generally trapezoidally shaped upwardly open cavities therebetween which cavities are wider at their open tops than at their bottoms, and
   e. fluid conduits at the bottoms of said cavities extending longitudinally of said cavities and also supported on said base,
   f. said conduits each including at least one upwardly projecting fin oriented at an angle between said generally vertical reflective surface and said inclined reflective surface,
   g. said fins comprising at least two in number, and wherein both fins have generally triangular cross sectional shapes such that each has one fin surface facing one of said reflective surfaces and the other fin surface facing the other fin and oriented parallel to other of said reflective surfaces, said fin defining conduit fabricated from an extruded plastic material and having a black color to absorb solar energy.

11. A solar heating panel according to claim 10 wherein said conduit has a fluid opening so defined that a portion of said opening extends upwardly into at least one of said at least two fins.

12. A solar heating panel according to claim 11 wherein said traingular shaped upwardly projecting fins have their respective vertices spaced below the upper marginal edges of said reflective surfaces, and a transparent cover supported by the upper edges of said reflective surfaces.

13. A solar heating panel comprising:
 a. a generally horizontally extending base,
 b. a plurality of generally vertically extending reflective surfaces supported by said base,
 c. a plurality of inclined reflective surfaces extending downwardly between said vertical surfaces and also supported by said base,
 d. said reflective surfaces defining generally trapezoidally shaped upwardly open cavities therebetween which cavities are wider at their open tops that at their bottoms, and
 e. fluid conduits at the bottoms of said cavities extending longitudinally of said cavities and also supported on said base,
 f. said conduits each including at least one upwardly projecting fin oriented at an angle between said generally vertical reflective surface and said inclined reflective surface, and each said conduit fabricated from an extruded plastic material, and wherein said conduit has a fluid opening so defined that a portion of said opening extends upwardly into said fin,
 g. said fins comprising at least two in number, and wherein both fins have generally triangular cross sectional shapes such that each has one fin surface facing one of said reflective surfaces and the other fin surface facing the other fin and oriented parallel to other of said reflective surfaces, said fin defining conduit fabricated from an extruded plastic material and having a black color to absorb solar energy.

14. A solar heating panel according to claim 13 wherein said conduit fin surfaces which face each other define an angle at least approximately equal to that defined by the two reflective surfaces which define the cavity in which said conduit is mounted, and such that the facing fin surfaces intersect one another above said conduit.

15. A solar heating panel according to claim 14 wherein said conduit fin surfaces which face said reflective surfaces, respectively, define inclined planes which if extended downwardly will intersect one another at or below the similarly defined intersection of said reflective surfaces.

16. A solar heating panel according to claim 15 wherein the plurality of upwardly open cavities defined by said reflective surfaces are separated by generally triangular upstanding portions of said base, said base being fabricated from a material with heat insulating properties.

17. A solar heating panel according to claim 16 and further characterized by a cover supported by said upstanding portions of said base, said cover being fabricated from a material which transmits at least a major portion of the incident solar energy.

18. A solar heating panel according to claim 8 and further characterized by a cover supported by said upstanding portions of said base, said cover being fabricated from a material which transmits at least a major portion of the incident solar energy.

* * * * *